(12) United States Patent
Chae et al.

(10) Patent No.: US 6,515,726 B2
(45) Date of Patent: Feb. 4, 2003

(54) LCD PANEL WITH LOW RESISTANCE INTERCONNECTION

(75) Inventors: Gee Sung Chae, Incheon-Kwangyokshi; Gyoo Chul Jo, Kyonggi-do, both of (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/983,734

(22) Filed: Oct. 25, 2001

(65) Prior Publication Data

US 2002/0057395 A1 May 16, 2002

(30) Foreign Application Priority Data

Nov. 13, 2000 (KR) .................................... 2000-0067154

(51) Int. Cl.$^7$ ........................ G02F 1/1343; G02F 1/136
(52) U.S. Cl. ........................................ 349/139; 349/43
(58) Field of Search ........................ 349/43, 139, 187; 257/59, 72; 438/30

(56) References Cited

U.S. PATENT DOCUMENTS

| | | | | |
|---|---|---|---|---|
| 5,420,452 A | * | 5/1995 | Tran et al. ................... | 257/428 |
| 6,157,430 A | * | 12/2000 | Kubota et al. ............... | 349/147 |
| 6,177,968 B1 | * | 1/2001 | Okada et al. ................ | 349/143 |
| 6,278,502 B1 | * | 8/2001 | Colgan et al. ................ | 349/38 |
| 6,333,520 B1 | * | 12/2001 | Inoue .......................... | 257/401 |

* cited by examiner

*Primary Examiner*—Toan Ton
(74) *Attorney, Agent, or Firm*—Morgan, Lewis & Bockius LLP

(57) ABSTRACT

A thin film transistor (TFT) array and an LCD (Liquid Crystal Display) panel made therefrom where at least one of the gate lines, the source electrodes, the drain electrodes and the data lines is formed of a copper alloy having a copper portion and a metal portion doped in the copper portion. The metal portion in the copper alloy includes a metal whose heat of metal oxide formation energy is greater than that of copper. The metal may be one selected from Ti (Titanium), Cr (Chromium), Ta (Tantalum), Mo (Molybdenum), In (Indium), Sn (Tin) and Al (Aluminum). The copper alloy has a high acid resistance, a high chemical resistance, and a high tolerance for moisture. The use of the copper alloy allows formation of a low resistance interconnection of copper that has a high electrical conductivity.

12 Claims, 2 Drawing Sheets copper crystal   CuO   when exposed to chemical   CuO   copper crystal copper crystal   metal oxide(MOx)   when exposed to chemical   metal oxide(MOx)   copper crystal

LCD PANEL WITH LOW RESISTANCE INTERCONNECTION

The present invention claims the benefit of Korean Patent Application No. P20000067154 filed in Korea on Nov. 13, 2000, which is hereby incorporated by reference.

BACKGROUND OF THE INVENTION

1. Field of the Invention

The present invention relates to a liquid crystal display panel, and more particularly, to a liquid crystal display (LCD) panel with low resistance interconnections.

2. Discussion of the Related Art

In order to provide an active matrix type LCD panel having a high precision, a large size, and a wide aperture, it is essential that the signal lines of a TFT (Thin Film Transistor) in the LCD panel (i.e., the gate and the data lines of the TFT) be thin and lengthy. Moreover, for eliminating wave distortion of a pulse signal, it is preferable to have low resistance interconnections for the LCD panel. Metals such as gold, aluminum, copper, and platinum are generally used as materials for LCD panel interconnections. A related art process for fabricating a TFT in an LCD panel using one of the foregoing single metals is explained below.

In the process to form gate lines, gate electrodes, and gate pads of the TFT array in the LCD panel, a metal, such as copper, is sputtered on a transparent substrate and thereafter subjected to a photo process and wet etching (by chemical). After the gate lines, the gate electrodes, and the gate pads are formed, a gate insulating film of $SiN_x$, or the like, is formed on the surface of the transparent substrate that includes the TFT-array part and the gate pad part, by PECVD (Plasma Enhanced Chemical Vapor Deposition).

A semiconductor layer of a-Si or the like and an impurity-doped semiconductor layer of $n^+$a-Si or the like are deposited on the gate insulating film by PECVD, and thereafter patterned to leave the semiconductor layers on a TFT forming region (i.e., the TFT-array part) over the gate electrodes, thereby forming an active layer and an ohmic contact layer of the TFT array.

A metal, such as copper, is deposited on the surface of the substrate and thereafter selectively removed to form data lines and source/drain electrodes of the TFT array. The data lines, together with data pads, are formed to cross the gate lines. Then, the ohmic contact layers between the source and drain electrodes are removed selectively by using a mask for the source/drain electrodes.

After a protection film is formed on the substrate surface that includes the data lines and the source/drain electrodes, the gate insulating film and the protection film formed on the gate pad parts are removed by wet etching with chemicals to expose a region of the gate pads. Also, the protection film over the drain electrodes is removed selectively to form contact holes. The protection film on the data pads is similarly removed by wet etching with chemicals to expose a region of the data pad.

Then, ITO (Indium Tin Oxide) is sputtered, and wet etched, to form a transparent conductive film on each gate pad and data pad such that the transparent conductive film is in contact with both the gate pad and the data pad. At the same time, a pixel electrode connected to the drain electrode is formed in each pixel region in the TFT array.

However, the foregoing prior art method for fabricating an LCD panel has the following problems.

As the interconnection metal is in the form of a thin film of polycrystalline grains, the grain boundaries between the grains in an aggregate of the polycrystalline grains are non-crystalline. A non-crystalline grain boundary is susceptible to electricity and chemical that distort intrinsic characteristics of the grain boundary and thereby alter properties (e.g., electrical properties) of the interconnection metal. For example, a copper interconnection with non-crystalline grains becomes susceptible to acid so as to exhibit the distortion caused by CuO present at the grain boundary. Therefore, it has been very inconvenient to prepare a separate TFT-array fabrication process since an interconnection of the TFT-LCD using such copper containing CuO at a grain boundary of a crystal is susceptible to chemical and moisture.

Problems with a copper interconnection susceptible to chemical are explained in detail with reference to FIG. 1, which illustrates a reaction in wet etching of copper interconnections in a related art LCD panel. FIG. 1 shows that the CuO at the grain boundary of a polycrystalline copper thin film is exposed to chemicals to initiate corrosion at the grain boundary and develop the corrosion along the grain boundary of the crystalline grain. As properties (e.g., electrical properties) of the copper thin film are distorted significantly due to the corrosion, the properties of the copper interconnection are substantially deteriorated.

In the fabrication process of a TFT-array which drives unit pixels, the etching of ITO (Indium Tin Oxide) used as pixel electrodes and gate and data lines, and the etching of silicon oxide or silicon nitride used as an insulating layer or protection layer is required. As such an etching is generally performed by introduction of certain chemicals that produce salt or ion continuously based on their chemical reactions during the etching process, the properties of these chemicals are susceptible to change over time. If such an etching chemical infiltrates into an interconnection, that chemical is likely to develop corrosion of the interconnection instantly. Also, because the interconnection of copper is susceptible to moisture, corrosion can be developed at the copper interconnection due to any change in the pH during the course of washing the chemical. For example, because an ITO etchant comes into contact with the gate lines under the ITO when the ITO electrodes are patterned to form the pixel electrodes, if the gate lines are not resistant to the ITO etchant, the gate lines may get broken or cracked due to corrosion. Therefore, the reaction between the chemical (etchant, or stripper) used in wet etching and the CuO needs to be taken into account during the LCD panel fabrication, and a specific chemical should be prepared based on the reaction information. However, even if the composition of the etching chemical is adjusted, the process tolerance still remains small and the process stability low.

Thus, in order to solve the problem of copper being susceptible to chemical and moisture, a copper alloy, rather than pure copper, may be used. However, even if the copper alloy is used during fabrication of LCD panel interconnections, the copper alloy with more than 1% of non-copper content may deteriorate electrical conductivity. This is undesirable because good electrical conductivity is supposed to be the greatest advantage of pure copper.

SUMMARY OF THE INVENTION

Accordingly, the present invention is directed to a TFT array in an LCD panel that substantially obviates one or more of the problems due to limitations and disadvantages of the related art.

In one embodiment, the present invention provides a copper alloy that includes a copper portion and a metal portion doped in the copper portion. The metal portion in the copper alloy includes a metal whose heat of metal oxide formation energy is greater than that of copper. In one embodiment, the metal is one selected from Ti (Titanium), Cr (Chromium), Ta (Tantalum), Mo (Molybdenum), In (Indium), Sn (Tin) and Al (Aluminum). The doping concentration of the metal portion is in the range of 0.001% to 0.1% of the copper portion.

In another embodiment, the present invention provides a thin film transistor (TFT) array and an LCD panel made therefrom where at least one of the gate lines, the source electrodes, the drain electrodes and the data lines is formed of the copper alloy according to the present invention.

The formation of a metal oxide of an alloy of copper that is doped to a required amount at a grain boundary of crystalline copper with a metal whose heat of metal oxide formation energy is greater than that of copper permits to reduce corrosion of interconnections caused by wet etching during fabrication of a TFT array for an LCD display panel. The copper alloy has a high acid resistance, a high chemical resistance, and a high tolerance for moisture. The use of the copper alloy according to the present invention prevents damage to the interconnection during and after fabrication of the TFT array, and allows formation of a low resistance interconnection of copper that has a high electrical conductivity.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF PREFERRED EMBODIMENTS

Figure 1:
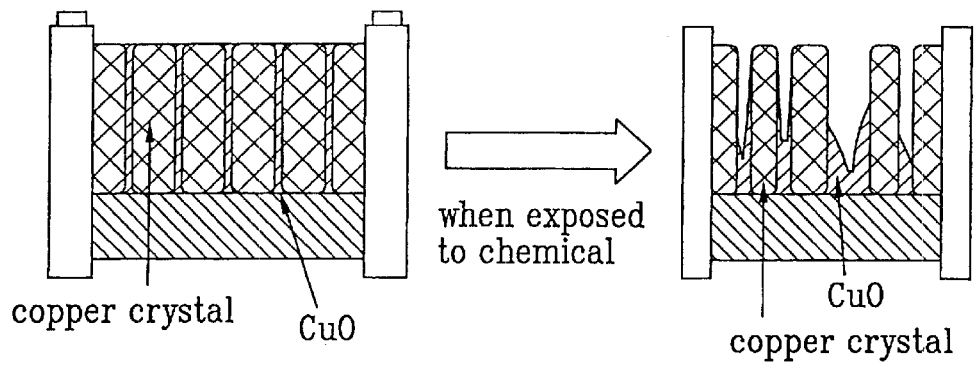
FIG. 1 illustrates a reaction in wet etching of copper interconnections in a related art LCD panel.
Figure 2:
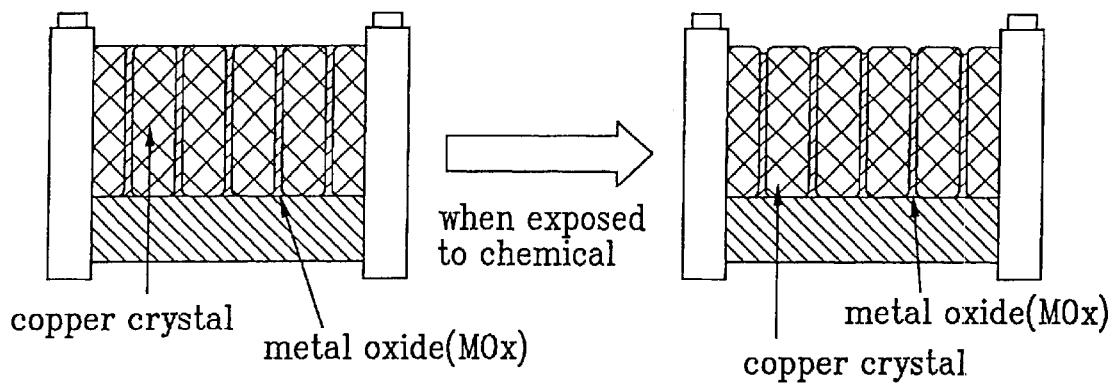
FIG. 2 illustrates a reaction in wet etching of copper interconnections in an LCD panel in accordance with a preferred embodiment of the present invention.

Reference will now be made in detail to the preferred embodiments of the present invention, examples of which are illustrated in the accompanying drawings. FIG. 2 illustrates a reaction in wet etching of copper interconnections of a TFT-array in an LCD panel in accordance with a preferred embodiment of the present invention.

Referring to FIG. 2, a metal oxide MOx is shown formed at a grain boundary of polycrystalline copper alloyed with a metal having a heat of metal oxide formation energy greater than that of copper. As opposed to CuO, the Mox is not susceptible to chemical and moisture. The alloying of the copper and a metal having a heat of metal oxide formation energy greater than that of copper prevents oxidation or reduction of CuO present at the grain boundary of polycrystalline copper. Some examples of the metal having a heat of metal oxide formation energy greater than that of copper include Ti (Titanium), Cr (Chromium), Ta (Tantalum), Mo (Molybdenum), In (Indium), Sn (Tin), Al (Aluminum), and the like.

It is noted that an interconnection made of the copper alloy according to the present invention exhibits less corrosion because the MOx present at the copper grain boundary corrodes less than CuO. The metal content doped as part of the alloy is required to be about 0.001% more in amount than an amount oxidizable by CuO such that the metal is comparatively superior to CuO in case of oxidizable amounts. However, to cope with a situation where copper is oxidized in excess of an activation ratio of copper (i.e., the copper is oxidized in excess of an oxidizable amount of copper), it may be necessary for the doped amount of the metal to have a certain surplus. That is, the doping concentration of the metal is provided with a certain tolerance over the 0.001% value. Because the doping of the copper with the metal that is 0.1% more than the oxidizable amount increases the resistance of the resulting alloy, the metal content in the alloy is preferably maintained below 0.01%. In one embodiment, the doping concentration in the copper has a 0.001%–0.1% tolerance greater than the oxidizable amount as discussed hereinbelow with reference to FIG. 3.

Figure 3:
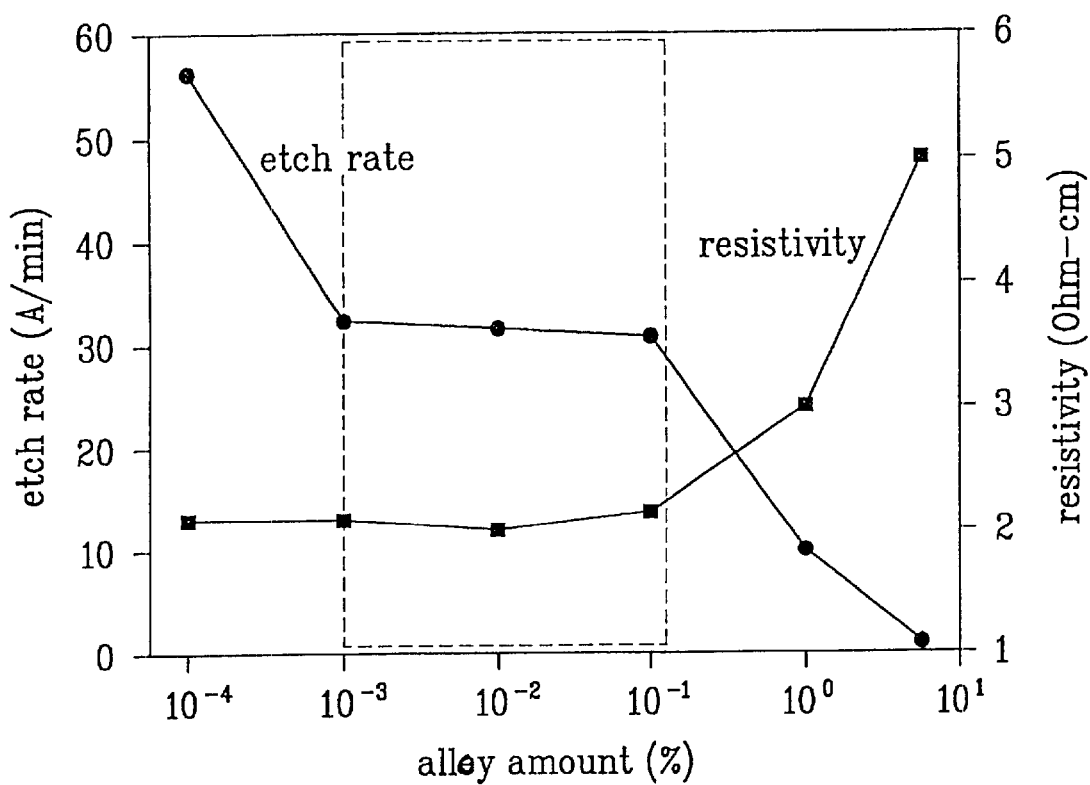
FIG. 3 illustrates a graph showing etch rate and resistivity against the percentage of non-copper content in a copper alloy according to one embodiment of the present invention.

FIG. 3 illustrates a graph showing etch rate and resistivity against the percentage of non-copper content in a copper alloy according to one embodiment of the present invention.

Referring to FIG. 3, it is observed that the more the metal content doped in copper, the higher the resistivity and the lower the etch rate. Though the etch rate drops when the doped metal content is increased due to increased chemical resistance and tolerance to moisture, the increased resistivity causes a problem in the electrical conductivity of the TFT-array interconnection fabricated using such an increased doped metalcontent. Therefore, to alleviate such problems, in one embodiment, the metal is doped in the range of about 0.001–0.1% of the copper portion. The etch rate and the resistivity are appropriately compromised in this range of doping, which reduces the danger of line breakage caused by wet etching and also the danger of increased resistivity caused by an excessive metal content.

One embodiment of a process of fabricating a TFT-array for an LCD panel using wet etching is explained hereinbelow.

After particles and organic substances are removed from a transparent substrate and the transparent substrate is washed for enhancing the adhesive force between a metal thin film of gate lines and the transparent substrate, the copper alloy of the present invention (which includes the copper portion, and the metal portion in the range of about 0.001–0.1%) is sputtered on the substrate and thereafter subjected to a photo process and wet etching to form a gate line (which includes a gate electrode and a gate pad). After the formation of the gate line, a gate insulating film of silicon oxide or silicon nitride is formed on the entire surface (inclusive of the TFT-array part and the gate pad part) by PECVD. Thereafter, a semiconductor layer of a-Si or the like and an impurity doped semiconductor layer of $n^+$a-Si or the like are formed on the gate insulating film by PECVD, and then selectively removed except for the thin film transistor region on the TFT-array, thereby forming an active layer and an ohmic contact layer of the thin film transistor. The copper alloy identical to the copper alloy used in the formation of the gate line may be deposited on the entire surface of the substrate and subjected to wet etching with chemical to form a data line and source/drain electrodes. The data lines (inclusive of the data pads) are formed at fixed intervals perpendicular to the gate lines. After a protection film is formed on the entire surface of the substrate inclusive of the source/drain electrodes, the gate insulating film, the protection film over the gate pad and the protection film on both the drain electrode and the data pad are removed by wet etching with chemical to form respective contact holes therein. The ITO is then sputtered and wet etched to form a transparent conductive film on the gate pad and the data pad in such a manner that the ITO is in contact with the gate pad and the data pad. At the same time, a pixel electrode is formed in the pixel region in such a way that the pixel electrode is connected to the drain electrode.

Accordingly, the danger of line breakage, caused by the ITO etchant that happens to come into contact with the gate line, the gate pad, the data line and the data pad placed under the ITO when the ITO electrode is patterned for forming the transparent conductive film and the pixel electrode, is reduced. Also, the corrosion of interconnection can be reduced during the wet etching for forming the interconnection. The possibility of unintended corrosion caused by infiltration of chemical to interconnection can also be reduced during the wet etching of the source/drain electrodes, and silicon oxide or silicon nitride used as the insulating film or the protection film. Furthermore, the corrosion due to the pH change during washing of the chemical with water can be reduced.

As has been explained, the LCD panel with a low resistance interconnection of the present invention has many advantages. For example, the formation of a metal oxide of an alloy of copper that is doped to a required amount at a grain boundary of crystalline copper with a metal whose heat of metal oxide formation energy is greater than that of copper permits a reduced corrosion of interconnections caused by wet etching during fabrication of a TFT array for an LCD display panel. The copper alloy has a high acid resistance, a high chemical resistance, and a high tolerance for moisture. The use of the copper alloy according to the present invention prevents damage to the interconnection during and after fabrication of the TFT array, and allows formation of a low resistance interconnection of copper that has a high electrical conductivity.

The troublesome selection of a chemical or separate preparation of a chemical that can be used in the wet etching process, for solving the problem of CuO formed/distributed at grain boundaries of crystalline copper given the adjustable reaction between a chemical and CuO, can be avoided.

It will be apparent to those skilled in the art that various modifications and variations can be made in the LCD panel with a low resistance interconnection of the present invention without departing from the spirit or scope of the invention. Thus, it is intended that the present invention cover the modifications and variations of this invention provided they come within the scope of the appended claims and their equivalents.

What is claimed is:

1. A copper alloy to be used as a metal interconnection of a liquid crystal display panel, comprising:
   a copper portion; and
   a metal portion doped in the copper portion,
   wherein the metal portion includes a metal whose heat of metal oxide formation energy is greater than that of copper, and the doping concentration of the metal portion is in the range of about 0.001% to about 0.1% of the copper portion.

2. The copper alloy of claim 1, wherein the metal is selected from the group consisting of Ti (Titanium), Cr (Chromium), Ta (Tantalum), Mo (Molybdenum), In (Indium), Sn (Tin) and Al (Aluminum).

3. A thin film transistor (TFT) array, comprising:
   a substrate;
   a plurality of gate lines formed on the substrate;
   a plurality of source electrodes and drain electrodes formed on the substrate; and
   a plurality of data lines formed on the substrate at predetermined intervals thereon,
   wherein at least one of the plurality of gate lines, the plurality of source electrodes, the plurality of drain electrodes, and the plurality of data lines is formed of a copper alloy comprising a copper portion and a metal portion doped in the copper portion, the metal portion includes a metal whose heat of metal oxide formation energy is greater than that of copper, and the doping concentration of the metal portion is in the range of about 0.001% to about 0.1% of the copper portion.

4. The TFT array of claim 3, wherein the plurality of data lines is formed perpendicular to the plurality of gate lines.

5. The TFT array of claim 3, wherein the metal in the metal portion is selected from the group consisting of Ti (Titanium), Cr (Chromium), Ta (Tantalum), Mo (Molybdenum), In (Indium), Sn (Tin) and Al (Aluminum).

6. The TFT array of claim 3, further comprising:
   a plurality of pixel electrodes formed on the substrate, wherein each of the plurality of pixel electrodes is connected to a corresponding one of the plurality of drain electrodes.

7. A liquid crystal display (LCD) panel, comprising:
   a thin film transistor (TFT) array that includes:
   a substrate;
   a plurality of gate lines formed on the substrate;
   a plurality of source electrodes and drain electrodes formed on the substrate; and
   a plurality of data lines formed perpendicular to the plurality of gate lines at predetermined intervals on the substrate,
   wherein at least one of the plurality of gate lines, the plurality of source electrodes, the plurality of drain electrodes, and the plurality of data lines is formed of a copper alloy comprising a copper portion and a metal portion doped in the copper portion, the metal portion includes a metal whose heat of metal oxide formation energy is greater than that of copper, and the doping concentration of the metal portion in the copper alloy is in the range of about 0.001% to about 0.1% of the copper portion.

8. The LCD panel of claim 7, wherein the metal in the metal portion is selected from the group consisting of Ti (Titanium), Cr (Chromium), Ta (Tantalum), Mo (Molybdenum), In (Indium), Sn (Tin) and Al (Aluminum).

9. The LCD panel of claim 8, wherein the TFT array further includes a plurality of pixel electrodes formed on the substrate, wherein each of the plurality of pixel electrodes is connected to a corresponding one of the plurality of drain electrodes.

10. A method of fabricating a TFT array, comprising:
    forming a plurality of gate lines on a transparent substrate;

forming a gate insulating film on the plurality of gate lines on the transparent substrate;

forming a plurality of data lines on the gate insulating film at predetermined intervals on the transparent substrate, wherein the plurality of data lines are oriented perpendicular to the plurality of gate lines; and forming a plurality of source electrodes and drain electrodes on the gate insulating film simultaneously with the plurality of data lines, wherein at least one of the plurality of gate lines, the plurality of source electrodes, the plurality of drain electrodes, and the plurality of data lines is formed of a copper alloy comprising a copper portion and a metal portion doped in the copper portion, the metal portion includes a metal whose heat of metal oxide formation energy is greater than that of copper, and the doping concentration of the metal portion in the copper alloy is in the range of about 0.001% to about 0.1% of the copper portion.

11. The method of claim 10, wherein the metal in the metal portion is selected from the group consisting of Ti (Titanium), Cr (Chromium), Ta (Tantalum), Mo (Molybdenum), In (Indium), Sn (Tin) and Al (Aluminum).

12. The method of claim 10, further comprising forming a plurality of pixel electrodes on the transparent substrate, wherein each of the plurality of pixel electrodes is connected to a corresponding one of the plurality of drain electrodes.

* * * * *